Patented Mar. 22, 1927.

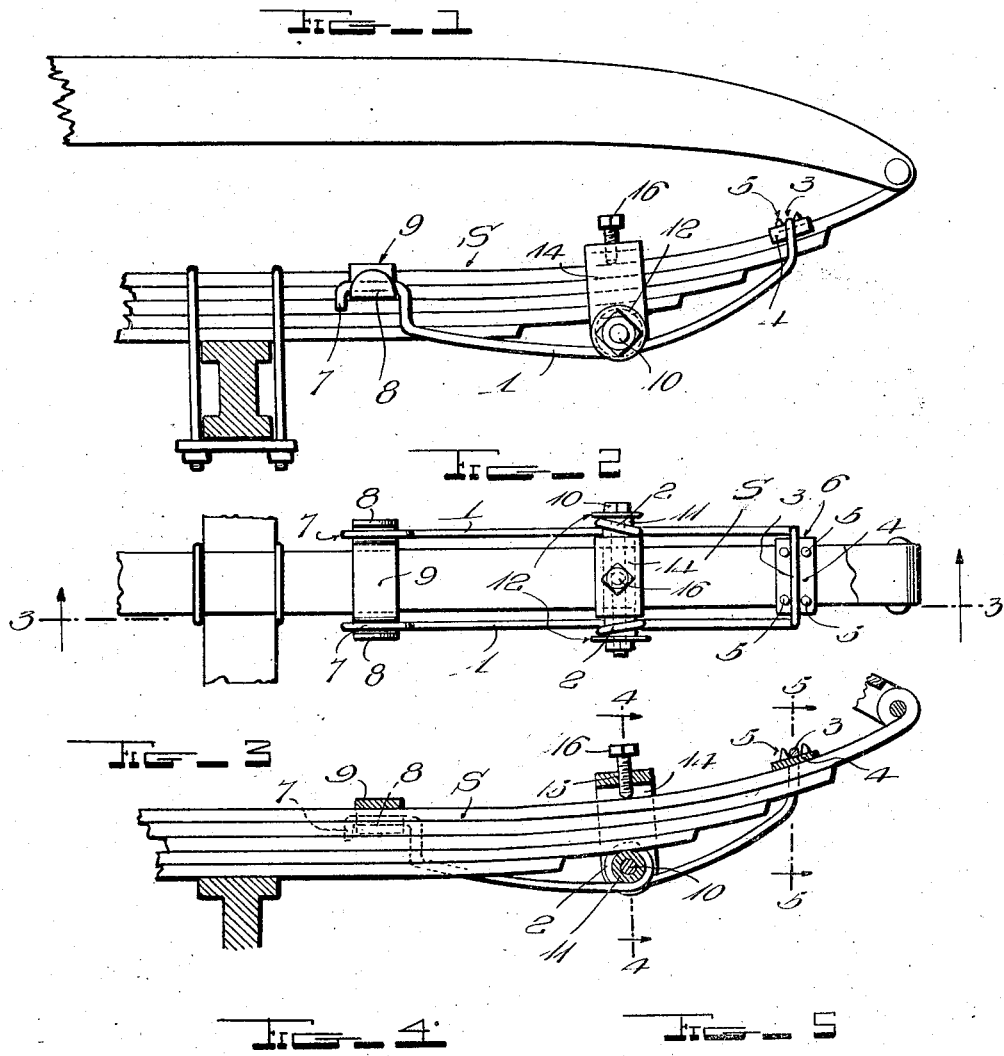

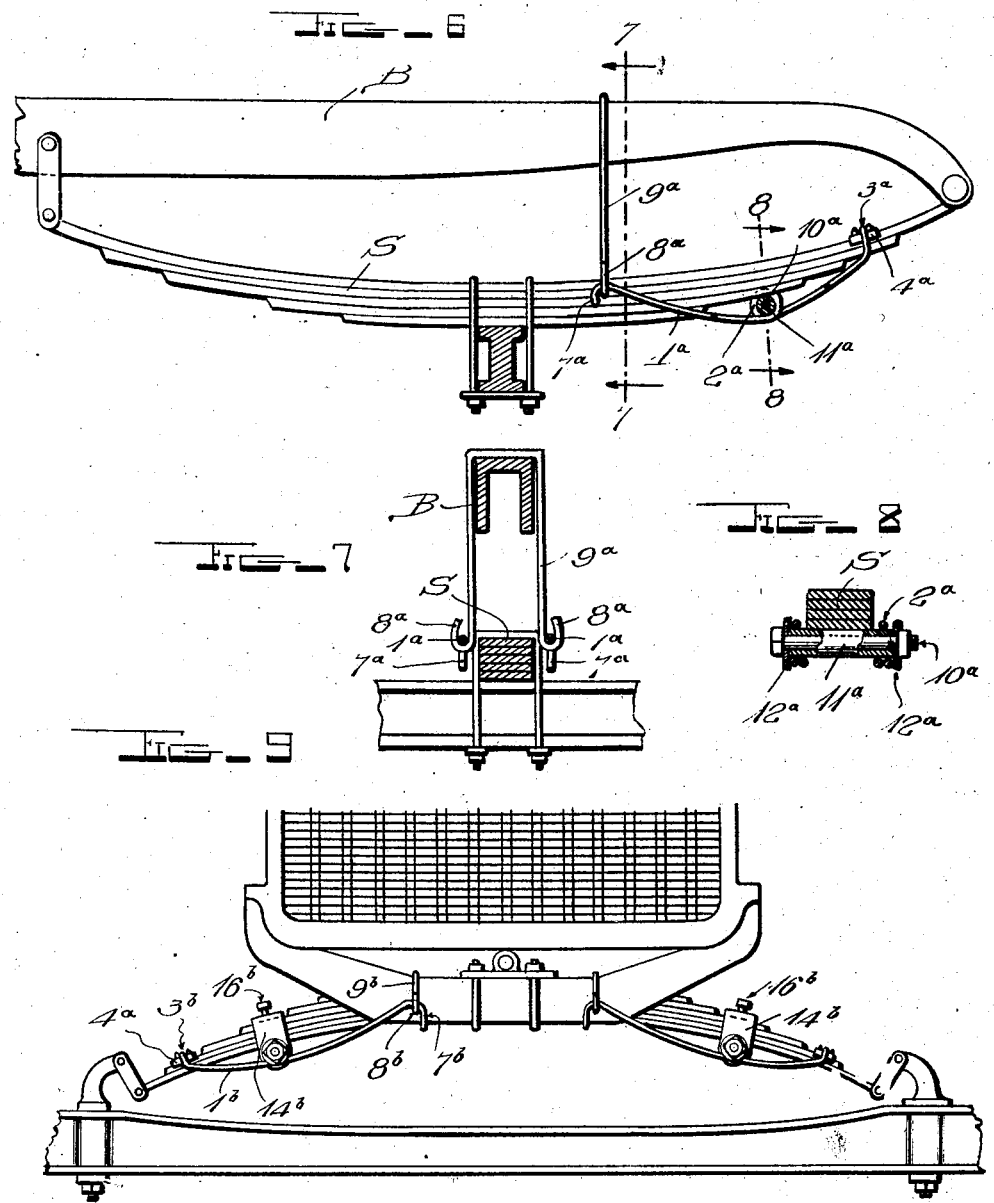

1,621,532

UNITED STATES PATENT OFFICE.

HOWARD B. GATES, OF PALATKA, FLORIDA.

SHOCK ABSORBER.

Application filed January 23, 1925, Serial No. 4,195. Renewed January 7, 1927.

My invention aims to provide a simple and inexpensive, yet an efficient and very desirable shock absorber which may be easily applied to vehicle springs of different types, and with this general object in view, the invention resides in the novel subject matter hereinafter described and claimed, the description being supplemented by the accompanying drawing.

Figure 1 is a side elevation showing one form of construction applied to one of the front springs of a conventional form of automobile.

Figure 2 is a plan view of the parts shown in Fig. 1.

Figure 3 is a longitudinal sectional view as indicated by line 3—3 of Fig. 2.

Figures 4 and 5 are detail transverse sectional views on lines 4—4 and 5—5 of Fig. 3.

Figure 6 is a view similar to Fig. 1, partly broken away and in section, showing a slightly different form of construction and a different manner of attachment.

Figures 7 and 8 are vertical sectional views on lines 7—7 and 8—8 of Fig. 6.

Figure 9 is a fragmentary front elevation of a well known type of automobile, showing the application of the invention thereto.

In the form of construction illustrated in Figs. 1 to 5, the numerals 1 designate two lengths of spring rod, said lengths being coiled between their ends to provide a pair of eyes 2. The lengths 1 are adapted for disposition at opposite sides of a vehicle spring S and they are integrally connected at one end by an arched member 3 which is adapted to straddle the spring, with its crown portion overlying the latter. Preferably, a saddle plate 4 is interposed between the crown portion of the member 3 and the upper leaf of the spring, and to hold said plate against shifting longitudinally of the spring, it is provided with upward projections 5 at opposite sides of said crown portion, which projections may well be formed by upwardly stamping portions of the plate. The ends of this plate are preferably bent downwardly as at 6 to straddle the spring.

The other ends of the reaches or lengths 1, that is the ends remote from the arched member 3, are bent to form hooks 7 which are engaged with hooks 8 on the ends of an arched saddle 9 which straddles the spring S near its central anchorage, the entire device, being disposed between this anchorage and one end of the spring, as shown.

A bolt 10 has been shown passing through the eyes 2 and adapted to underlie the spring S, this bolt being preferably surrounded by a sleeve 11. Washers 12 are clamped against the ends of this sleeve by the head and the nut of the bolt 10, to prevent outward shifting of the eyes 2, as shown most clearly in Fig. 4. The sleeve and bolt pass through horizontally alined openings 13 in the ends of an arched clip 14 which is adapted to straddle the spring S, the crown portion of this clip being formed with an opening 15 in which a set-screw 16 is threaded, said set-screw being adapted for engagement with the upper leaf of the spring, so that the entire clip may be adjusted upwardly to move the sleeve 11 into contact with the lower side of the spring.

By the simple and inexpensive construction shown and described, downward flexing of the vehicle spring will not be interfered with, but recoil will be effectively absorbed, as the device prevents separation of the leaves on the rebound action, thus causing them to jointly act in absorbing the shock.

In the form of construction illustrated in Figs. 6, 7 and 8, the parts 1ª, 2ª, etc. correspond to the parts 1, 2, etc. of the figures previously described. It is to be observed however that the clip 14 has been dispensed with, and it may here be stated that this clip may or may not be used in connection with any form of the invention, as occasion may demand. It is to be further observed that in Figs. 6 and 7, the arched saddle 9ª extends over the chassis bar B, instead of merely extending over a portion of the spring S. If desired, this form of anchorage could of course be used in connection with the form of construction first described.

In Fig. 9, the characters 1ᵇ, 2ᵇ, etc., correspond to the parts 1, 2, etc. of the form of construction shown in Figs. 1 to 5, but two of the devices are shown applied to opposite ends of a Ford spring, and the saddles 9ᵇ extend over the spring anchoring bar of the chassis frame.

In any of its forms, the invention is simple, inexpensive, and easily applied, yet it will be effective and in every way desirable.

As excellent results may be obtained from the structural details shown, they may well be followed, but within the scope of the invention as claimed, modifications may of course be made.

I claim:

1. A shock absorber comprising two lengths of spring rod for disposition at opposite sides of a vehicle spring, said lengths being coiled between their ends to form eyes, a transverse member adapted to underlie the spring, said member having its ends mounted in said eyes, transverse means connecting said lengths at one end of the latter and adapted to overlie the spring near an end of the same, and an arched saddle connected with the other ends of said lengths for supporting the same.

2. A shock absorber comprising two lengths of spring rod for disposition at opposite sides of a vehicle spring, said lengths being coiled between their ends to form eyes, a transverse member adapted to underlie the spring, said member having its ends mounted in said eyes, transverse means connecting said lengths at one end of the latter and adapted to overlie the spring near an end of the latter, the other ends of said lengths being bent to form hooks, and an arched saddle having upwardly directed hooks at its ends for engagement with said first named hooks to anchor said other ends of said lengths of rod.

3. A shock absorber comprising two lengths of spring rod for disposition at opposite sides of a vehicle spring, said lengths being integrally connected at one end by an arched member adapted to straddle the spring near one end of the latter, a saddle plate adapted for disposition between the crown of said arched member and the spring, said saddle plate having upwardly extending projections to engage opposite sides of said crown and hold the plate against shifting longitudinally of the spring, and attaching means for the other ends of said lengths of rod.

4. A shock absorber comprising an arched clip adapted to straddle a vehicle spring, the crown of said clip having a vertical opening and the ends of said clip being formed with horizontally alined openings, a horizontal member passing through the last named openings and adapted to underlie the spring, a set-screw threaded through the vertical opening to engage the upper leaf of the spring and elevate the clip to move said member toward the lower side of the spring, a pair of elongated auxiliary springs for disposition at opposite sides of the spring, said auxiliary springs having eyes between their ends through which said horizontal member passes, means for connecting one end of said auxiliary springs to the vehicle spring near one end of the latter, and attaching means for the other ends of said auxiliary springs.

5. A shock absorber comprising an arched clip adapted to straddle a vehicle spring, the ends of said clip being formed with horizontally alined openings, a horizontal member passing through said openings and adapted to underlie the spring, a pair of elongated auxiliary springs for disposition at opposite sides of the spring, said auxiliary springs having eyes between their ends through which said horizontal member passes, means for connecting one end of said auxiliary springs to the vehicle spring near one end of the latter, and attaching means for the other ends of said auxiliary springs.

In testimony whereof I have hereunto affixed my signature.

HOWARD B. GATES.